United States Patent

[11] 3,597,677

[72] Inventors Richard S. MaC Crea
 New Brighton;
 Joseph A Marino, Hopkins, both of, Minn.
[21] Appl. No. 771,133
[22] Filed Oct. 28, 1968
[45] Patented Aug. 3, 1971
[73] Assignee Marquette Corporation

[54] STROBOSCOPIC SPARK ADVANCE MEASURING APPARATUS
 7 Claims, 1 Drawing Fig.
[52] U.S. Cl. .................................................. 324/17,
 315/209
[51] Int. Cl. ...................................................... F02p 17/00
[50] Field of Search ............................................ 324/15-
 —18; 340/268; 356/23, 24; 315/209, 241; 73/116

[56] References Cited
 UNITED STATES PATENTS
2,715,711 8/1955 Wells .............................. 324/16
2,785,215 3/1957 Yetter ............................ 324/16
3,368,143 2/1968 Roberts ......................... 324/16
3,499,322 3/1970 Pelta .............................. 324/16 X FOREIGN PATENTS
945,240 12/1963 Great Britain ................. 324/16

Primary Examiner—Michael J. Lynch
Attorneys—Frederick E. Lange, John J. Held, Jr. and Eugene L. Johnson ABSTRACT: Apparatus for determining the spark advance of an internal combustion engine by the use of a stroboscopic lamp in which a sawtooth voltage is initiated with the occurrence of a regularly repeating electrical impulse such as the firing of a particular spark plug and in which the stroboscopic lamp is energized during each cycle of the sawtooth voltage when the instantaneous amplitude of the sawtooth voltage reaches a predetermined value, the selected value of the instantaneous amplitude being determined by an adjustable means which selects a portion of the sawtooth voltage and applies it to a voltage comparison circuit which in turn controls the conductivity of the lamp. The adjusting means is calibrated in degrees of the cycle of the operation of the engine. The amplitude of the sawtooth voltage is determined by a capacitor charging circuit and the timing rate of the capacitor charging circuit is adjusted in accordance with its maximum amplitude to maintain the same constant.

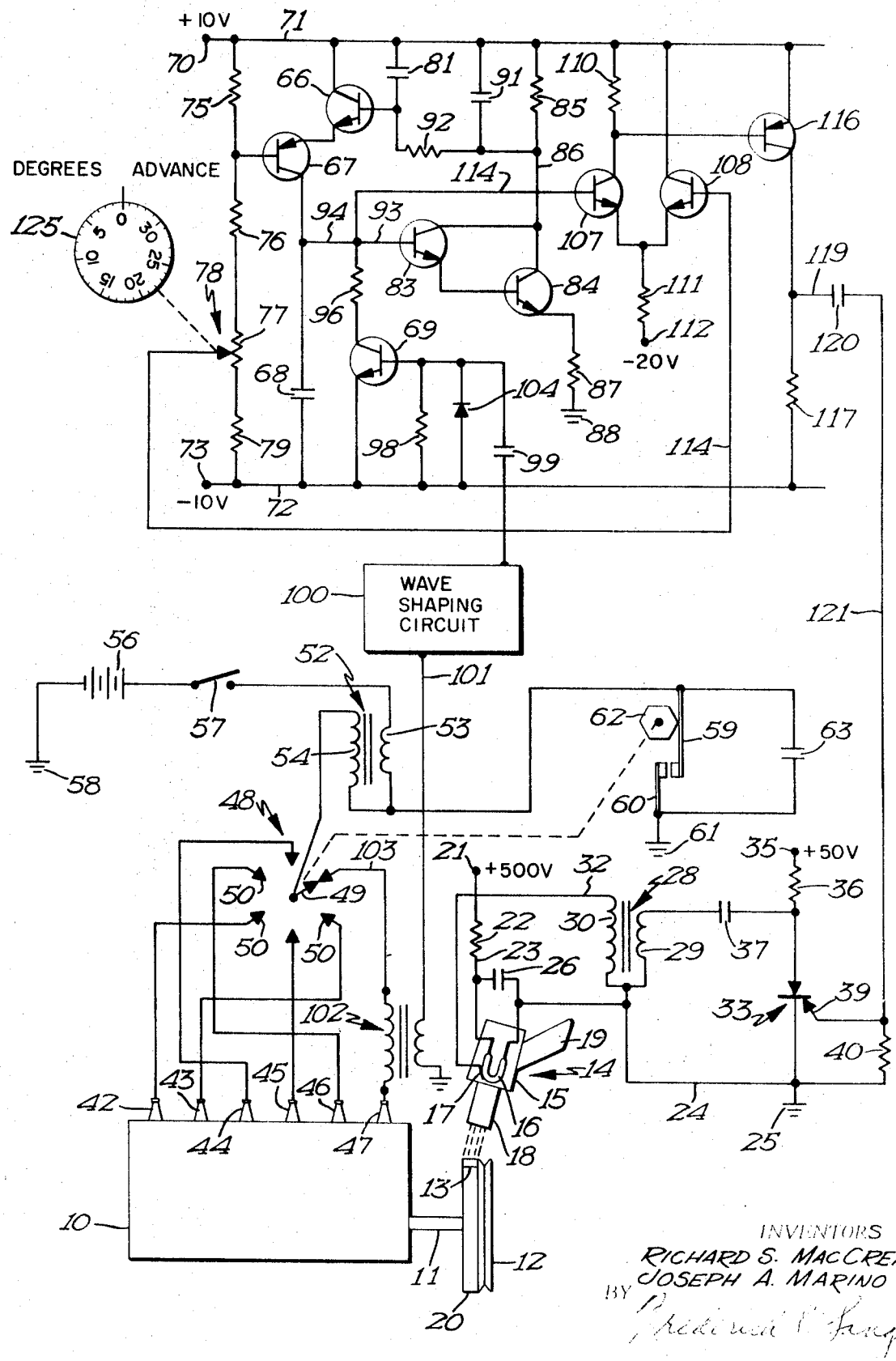

STROBOSCOPIC SPARK ADVANCE MEASURING APPARATUS

BACKGROUND OF THE INVENTION

It is quite common in the engine diagnostic art to employ a stroboscopic lamp for illuminating a selected part of an internal combustion engine and adjustably delaying the energization of the lamp until the selected part of the internal combustion engine appears to be at the desired position. The amount of adjustment is then observed and acts to indicate the extent of engine ignition advance. A typical system of this type is shown in the Wells et al. U.S. Pat. No. 2,715,711.

While prior devices of this type have provided a convenient means of observing the amount of ignition advance, they have suffered from the drawback that the means for adjusting the delay in energization of the stroboscopic lamp is independent of the operation of the engine and hence the ratio of the amount of delay to the length of the engine cycle is affected by any variation in speed of the engine. Thus, with prior devices of this type, it has been necessary to run the engine at a predetermined selected speed and to maintain this speed by observing a tachometer or other speed-measuring device.

SUMMARY OF THE INVENTION

The present invention is concerned with an arrangement of the type described above in which a sawtooth voltage is generated, each cycle of the sawtooth voltage being initiated with the occurrence of a regularly repeating electrical impulse related to the operation of the engine such as the firing of a selected spark plug. The energization of the stroboscopic light is then controlled in accordance with the instantaneous amplitude of the sawtooth voltage, the light being energized when this instantaneous amplitude reaches a predetermined selected value. Adjusting means is provided for selecting the amplitude at which the light is fired and this adjusting means may be provided with indicating means calibrated in degrees of the cycle of operation of the engine.

The apparatus further contemplates means for maintaining the maximum amplitude of the sawtooth voltage constant regardless of engine speed. Such sawtooth voltages are commonly generated by the use of a capacitor-charging circuit. This would tend to result in a lower amplitude as the engine speeds up since the capacitor does not have as much time to charge during the cycle of the engine. The present invention contemplates means for adjusting the timing rate of the capacitor-charging circuit so as to maintain the maximum amplitude of the sawtooth voltage substantially constant regardless of the speed at which the engine is being operated. This is done by means responsive to the maximum amplitude of the sawtooth voltage which adjusts the conductivity of an electronic impedance in series with the capacitor in the charging circuit in accordance with the amplitude of the sawtooth voltage.

The adjustable means for selecting the instantaneous amplitude of the sawtooth voltage at which the lamp is fired consists of means for selecting a variable portion of the sawtooth voltage and applying this variable portion to a voltage comparison circuit which is effective when the selected portion of the instantaneous voltage amplitude of the sawtooth voltage reaches a predetermined value each cycle to cause the lamp to be energized.

Various other objects and aspects of the invention will be apparent from the accompanying specification, claims and drawing.

BRIEF DESCRIPTION OF THE DRAWING

The single FIGURE of the drawing shows the apparatus in schematic form in connection with the spark plugs, ignition system and flywheel of a conventional internal combustion engine.

DESCRIPTION OF THE PREFERRED EMBODIMENT

Referring to the drawing, the present invention is shown in connection with an internal combustion engine 10 shown in highly schematic form. Extending from the engine is a crankshaft 11 to which is secured a pulley 12 having a flange 20. At a suitable point on the flange 20 of pulley 12 a timing mark 13 appears. In adjusting the ignition, it is desirable to adjust the ignition with respect to a predetermined position of the crankshaft. The timing mark is employed to determine when the crankshaft is at a predetermined position. By stroboscopically illuminating the flywheel at a frequency based upon the speed of engine rotation, the timing mark appears to stand still. By adjustably delaying or advancing the point at which the stroboscopic light is illuminated during each cycle of the engine, the apparent position of the timing mark can be adjusted. By adjusting the stroboscopic light in this manner and observing the amount of the adjustment necessary to bring the timing mark to the desired position, it is possible to determine the extent to which the ignition is advanced or retarded with respect to the desired amount of advance.

Referring again to the drawing, I have shown a conventional timing light 14 comprising a housing 15 in which is located a gas-filled flash tube 16 having a trigger electrode 17. The light from the flash tube is directed through a tubular light guide 18. The housing 15 is also preferably provided with a handle 19 so that the unit may be held by the mechanic in such a manner that the light from the flash tube 16 is so directed onto the pulley 20 as to illuminate the timing mark 13.

The timing light 14 normally includes certain electrical elements within the housing 15 and which are associated with the flash tube 16 to cause the same to fire at the desired time. For convenience in illustration, these various electrical elements are shown as located outside of the housing 15.

These elements associated with the timing light and normally included in the housing 15 will now be described. The main terminals of the flash tube 16 are connected across a capacitor 26 of larger capacity. Capacity 26 is connected between a source of positive voltage 21 and ground. The source 21 of positive voltage may, for example, be a source of voltage at +500 volts. The capacitor 26 is connected between this source of voltage 21 and ground through a circuit including a resistor 22, conductor 23, capacitor 26 and conductor 24 to ground at 25. During the periods when the tube 16 is nonconductive, this capacitor 26 is charged up. When the lamp 16 is rendered conductive by the application of a voltage to the trigger electrode 17, the capacitor 26 is rapidly discharged through the tube 16 to produce a high intensity flash of very short duration.

The voltage for the trigger electrode 17 is produced by a trigger transformer 28 having a low voltage primary 29 and a high voltage secondary 30. One terminal of the secondary winding 30 is connected to ground and the other terminal is connected by conductor 32 to the trigger electrode 17. The energization of the primary winding 29 is controlled by a silicon-controlled rectifier 33. The primary winding 29 is connected in a circuit extending from a terminal 35 connected to a positive source of voltage such as +50 volts, through a resistor 36, a capacitor 37, primary winding 29 and conductor 24 to ground. The silicon-controlled rectifier, or SCR, 33 has its anode connected to the junction of resistor 36 and capacitor 37 and has its cathode connected to ground. When the SCR 33 is nonconductive, current flows through the capacitor 37 and primary winding 29 until the capacitor 37 is fully charged. Due to the relatively high resistance value of resistor 36, the increase in the current through winding 29 occurs at a relatively slow rate and very little voltage is induced in the secondary winding 30. As soon, however, as the SCR 33 is rendered conductive, the capacitor 37 is discharged rapidly through the SCR 33 and the primary winding 29. This causes a rapid change in the current through winding 29 to result in a high voltage being generated in secondary winding 30 which voltage is applied to the trigger electrode 17 of the flash tube 16 to fire the same. The firing of the SCR 33 is caused by the application of a firing voltage to the firing electrode 39 of the SCR 33. Normally, the firing electrode 39 is maintained at substantially the potential of the cathode by a connection between the firing electrode 39 and ground through a resistor 40. When it is desired for the SCR to become conductive, a positive voltage is applied to the firing electrode 39 as will later be described.

Referring again to the engine 10, the engine is illustrated as being a six-cylinder engine. It is of course, understood that the invention is equally applicable to a four or eight-cylinder engine. The engine 10 is provided with six spark plugs 42—47. Each spark plug is connected to a different terminal of a distributor 48 of conventional construction. This distributor comprises a distributor arm 49 which is driven by the engine and which sequentially makes contact with a plurality of terminals 50, each of which is connected to a different one of the spark plugs 42—47. The terminals 50 are shown as connected to the various plugs in such a manner as to fire these in the desired firing order for a six-cylinder engine.

The voltage for firing the spark plugs 42—47 is produced by an ignition transformer 52 having a low voltage primary winding 53 and a high voltage secondary winding 54. The low voltage primary winding 53 is connected to the positive terminal of an automobile battery 56 through a conventional ignition switch 57. The opposite terminal of battery 56 is connected to ground at 58. The lower terminal of primary winding 53 is connected to a switch blade 59 which cooperates with a second switch blade 60 to form the conventional distributor breaker points. Switch blade 60 is grounded at 61. Cooperating with switch blade 59 is a six-sided cam 62 which serves to separate switch blades 59 and 60 six times for each revolution of cam 62. It is, of course, understood that if an eight-cylinder engine were being employed, the cam 62 would be eight sided. The usual capacitor 63 is connected across the points 59 and 60. Each time that the points 59 and 60 are open, there is an abrupt change in the current flowing through the primary winding 53 so as to induce a relatively high voltage in the secondary winding 54. This voltage is sequentially applied to the various plugs by the distributor 48 in the conventional manner.

Referring now to the apparatus for controlling the SCR 33 and hence the firing of the stroboscopic light 16, this comprises a plurality of transistors 66 and 67 which control the charging of a capacitor 68. The capacitor is periodically discharged by a further transistor 69 which, as will be presently described, is rendered conductive each time that a firing voltage is applied to the plug 47. Transistor 66 is an NPN transistor and transistor 67 a PNP transistor, the two transistors being connected in series with each other and with the capacitor 68 between a positive bus conductor 71 and a negative bus conductor 72. The positive bus conductor 71 is connected to a positive source of voltage indicated by the terminal 70 and which may, for example, be at +10 volts. The negative bus conductor 72 is connected to a terminal 73 of a negative source of voltage such as −10 volts. Also connected between the positive bus conductor 71 and negative bus conductor 72 are a pair of resistors 75 and 76, the resistor 77 of a rheostat 78, and a resistor 79. The base of transistor 67 is connected to the junction of resistors 75 and 76 so as to be maintained at a constant potential. Transistors 66 and 67 act as a variable impedance in series with capacitor 68 to control the charging rate of capacitor 68. The conductivity of transistor 66 and hence transistor 67 is controlled by the voltage across a capacitor 81 connected between the base and collector of transistor 66. The voltage existing across capacitor 81 is in turn controlled by two NPN transistors 83 and 84 connected in a Darlington type of compound circuit. Transistor 84 is connected between the positive bus conductor 71 and ground through a circuit including a resistor 85, a conductor 86, transistor 84 and a resistor 87 to a ground connection 88. It will be obvious that as the conductivity of transistor 84 is increased, the voltage drop across resistor 85 will increase causing the lower end to become less positive with respect to the upper end. The resistor 85 has connected in parallel therewith a capacitor 91. The parallel resistor 85 and capacitor 91 are in turn connected across capacitor 81 through a resistor 92. The base of transistor 83 is connected through conductors 93 and 94 to the upper or positive terminal of capacitor 68.

As previously noted, transistor 69 is connected across capacitor 68 and is effective to periodically discharge the same. It will be noted that the emitter of transistor 69 is connected to the lower terminal of capacitor 68 while the collector is connected through a resistor 96 and conductor 94 to the upper terminal of capacitor 68. Thus, when transistor 69 is conductive, the transistor 69 acts as a short circuit except for the impedance of the resistor 96 which has a relatively small resistance value.

The conductivity of transistor 69 is controlled by a connection to the No. 1 spark plug 47. The base of transistor 69 is normally connected to the negative bus conductor 72 through a resistor 98 so as to be normally maintained at the same potential as the emitter to prevent conduction of the transistor 69. The base is also connected, however, through a capacitor 99, a wave shaping circuit 100 and a conductor 101 to the secondary winding of a coupling transformer 102, the primary of which is connected between the spark plug lead 103 and the No. 1 plug 47. It is to be understood that the coupling transformer 102 is normally embodied in a coupling cable which is connected between the spark plug lead and the spark plug. The wave shaping circuit 100 may be of any conventional type such as a square wave generator which converts the oscillatory voltage appearing across the secondary of coupling transformer 102 into a square wave voltage. The capacitor 99 acts to differentiate this voltage resulting in positive and negative peaks. Rectifying diode 104 connected in parallel with resistor 98 serves to prevent the negative peaks from being applied to the base of transistor 69 so that only the positive peaks are applied. Thus, each time that a firing voltage is applied to plug 47, a positive voltage is momentarily applied to the base of transistor 69 to render the transistor conductive. This causes capacitor 68 to rapidly discharge. Immediately thereafter, the capacitor starts to again charge through transistors 66 and 67 at a rate determined by the conductivity of these transistors which in turn is controlled by the voltage across capacitor 81. The result is that a sawtooth voltage appears across the terminals of capacitor 68, this sawtooth voltage being in turn applied to the base of transistor 83.

When the maximum value of the sawtooth voltage is at the desired value, the conductivity of transistors 83 and 84 will be such that the voltage drop across resistor 85 and hence across capacitor 81 maintains transistors 66 and 67 at a conductivity such that the capacitor reaches the desired value at the end of the engine cycle. If the voltage across capacitor 68 tends to rise due to the engine slowing down and hence providing a longer engine cycle within which the capacitor 68 can be charged, the voltage applied to the base of transistor 83 will increase to increase the conductivity of that transistor and hence of transistor 84. This, in turn, causes a greater voltage drop to appear across resistor 85 and hence across capacitor 81. This in turn will tend to lower the potential of the base of transistor 66 with respect to the emitter causing the effective impedance of transistors 66 and 67 to increase. This reduces the time constant of the circuit including transistors 66 and 67 and capacitor 68 so that a longer time is required for the voltage across the capacitor 68 to reach the desired value. It will be obvious that if the engine speeds up so as to decrease the charging time, transistors 83 and 84 will become less conductive to in turn reduce the voltage across capacitor 81 and to increase the conductivity of transistors 66 and 67. This will in turn result in a faster charging rate for capacitor 68. With this arrangement, it will be apparent that the charging rate of capacitor 68 is automatically regulated to maintain the maximum voltage across it at a relatively constant value.

It will be obvious from the above that the apparatus, as just described, produces a sawtooth voltage each cycle of which begins at the time that the No. 1 plug 47 is first fired and continues to increase steadily in amplitude until the plug again fires. This sawtooth voltage always reaches the same maximum amplitude. It will be obvious that the instantaneous magnitude of the sawtooth voltage at any time is a measure of the portion of the engine cycle which has occurred. We utilize this effect by selecting an adjustable portion of the sawtooth voltage and causing the flash tube 16 of the stroboscopic light 14 to fire when the instantaneous value of the sawtooth voltage approaches a predetermined magnitude.

To accomplish the purpose just discussed, we utilize a voltage comparison circuit consisting of two NPN transistors 107 and 108. Transistor 107 has its collector and emitter connected in a circuit extending from the positive bus conductor 71 through a resistor 110, the collector and emitter of transistor 107 and a resistor 111 to a negative voltage source indicated by the terminal 112 which may, for example, be at −20 volts. The collector and emitter of the other transistor 108 are connected between the positive bus conductor 71 and the upper terminal of resistor 111 so that the collector and emitter of transistor 108 are connected in parallel with the resistor and the collector-emitter circuit of transistor 107. The base of transistor 107 is connected through conductors 114 and 94 to the upper terminal of capacitor 68 so that the voltage applied to the base of transistor 107 is always dependent upon the instantaneous magnitude of the sawtooth voltage. The base of transistor 108 is connected by conductor 114 to the slider of potentiometer 78. Since the resistor 77 of potentiometer 78 is connected in series with a plurality of fixed resistors between the positive bus conductor 71 and the negative bus conductor 72, the potential at the slider of potentiometer 78 remains constant for any given position of the slider. The base of transistor 108 is thus maintained at a constant value depending upon the position of the slider. Whenever the base potential of transistor 107 exceeds that of transistor 108, current will flow through transistor 107 to cause a voltage drop across resistor 110. The point at which this occurs in the cycle of the sawtooth voltage will depend upon the setting of the slider of potentiometer 78. When transistor 107 does become conductive, the lower terminal of resistor 110 becomes negative with respect to the upper terminal. The resistor 110 is connected between the base and emitter of a further PNP transistor 116. The emitter and collector of transistor 116 are connected between the positive bus conductor 71 and the negative bus conductor 72 in series with a resistor 117.

When the transistor 107 becomes conductive to produce a voltage drop across resistor 110, this results in the base of transistor 116 becoming negative with respect to the emitter to cause transistor 116 to become conductive to in turn produce a voltage drop across resistor 117, the polarity of this voltage drop being such that the upper terminal of resistor 117 is positive with respect to the lower terminal. The upper terminal of resistor 117 is in turn connected through a conductor 119, a capacitor 120 and a conductor 121 to the gating electrode of SCR 33. The capacitor 120 serves to differentiate the voltage across resistor 117 causing a sharp positive peak to be applied to the gating electrode 39 whenever the transistor 116 becomes conductive. This in turn causes SCR 33 to become conductive to produce an abrupt change in current through primary winding 29 of trigger transformer 28. This causes a voltage to be applied to the trigger electrode 17 of gas filled tube 16, in the manner previously described. Thus, whenever the instantaneous value of the sawtooth voltage approaches a predetermined value dependent upon the setting of the slider of potentiometer 78, the flash tube 16 is caused to fire to illuminate the timing mark 13. The point in the cycle of the sawtooth voltage at which this occurs is determined by the setting of the slider of potentiometer 78. The slider of potentiometer 78 is operatively connected to an adjusting knob 125 which may be calibrated in degrees of advance of the ignition.

While we have shown the majority of the various circuit components as outside of the housing 15 of the timing light for convenience in illustration, it is to be understood that normally all of the apparatus described above with the exception of the knob 125 and the engine being tested will be located within the housing 15. In such an arrangement, the knob 125 will be mounted on the wall of the housing in such a position that it can readily be adjusted by the mechanic using the equipment.

Referring now to the overall operation of the system, the apparatus is connected to an engine by disconnecting the spark plug lead 103 and inserting between the lead and the plug 47 the primary of coupling transformer 102. With the engine running and with the various power connections effective, a sawtooth voltage is generated, this sawtooth voltage being started each time that a firing voltage is applied to plug 47 and terminating when this firing voltage is again applied. The maximum voltage amplitude of the sawtooth voltage is maintained constant by varying the conductivity of transistors 83 and 84 in accordance with the maximum value of the sawtooth voltage. This in turn varies the voltage across capacitor 81 to in turn vary the conductivity of transistors 66 and 67 to affect the time constant of the charging circuit for capacitor 68. In this way, as the engine speeds up or slows down, the charging rate of capacitor 68 is adjusted accordingly to maintain the maximum value of the sawtooth voltage always constant. Once each cycle, the flash tube 16 is energized. The flash tube 16 is energized at a frequency which has a fixed relationship to the speed of the engine since the flash tube is energized each time that the plug 47 has a firing voltage applied thereto. If the operator holds the timing light 14 so that the light from it illuminates the mark 13, the mark 13 will appear to stand still. The operator can now adjust the knob 125 and the mark 13 will apparently shift in position due to the fact that the point in the engine cycle at which the timing light flashes is shifted. All that the operator needs to do now is to adjust the knob 125 until the timing mark appears to be in the desired position. The position of the knob 125 can now be read and this will indicate the number of degrees advance in the ignition timing. Because of the fact that the time in the engine cycle at which the tube 16 is fired is dependent upon a sawtooth voltage directly related to the operation of the engine, the adjustment of the firing of the timing light will be related to the engine operation. By maintaining the amplitude of the sawtooth voltage constant, the measurement of the spark advance is always constant and is not affected in any way by engine speed.

It will thus be seen that we have devised a simple means for the measurement of the amount of ignition advance which is independent of engine speed. Thus, it is no longer necessary to control accurately the engine speed during the measurement of the amount of ignition advance.

While we have shown a specific embodiment of our invention for purposes of illustration, it is to be understood that the scope of the invention is limited solely by the appended claims.

We claim:

1. Apparatus for determining the spark advance of an internal combustion engine having a timing mark for indicating a particular position of engine rotation, a spark plug, means for producing a high potential firing voltage for the spark plug including breaker points, and means for applying to the spark plug the firing voltage at a time substantially the same as that at which the points open, said apparatus comprising:

a coupling circuit for producing discrete pulses at its output coincident with the application thereto of discrete input signals, a connector for coupling the input of said coupling circuit to a spark plug of the internal combustion engine whose spark advance is to be determined, means connected to said coupling circuit for generating a sawtooth voltage each cycle of which is initiated as a result of a discrete pulse from said coupling circuit resulting from the application to said plug of a firing voltage, means for maintaining the maximum amplitude of the sawtooth voltage at a constant value, an electrically energized lamp for illuminating the timing mark of the engine, adjustable means for selecting a predetermined fixed value of voltage, comprising an adjustable impedance, a manually movable element connected to said impedance for adjusting the same, and indicia means calibrated in degrees of the cycle of operation of the engine, a portion of the indicia means being positioned by said manually movable element so that said indicia means always indicates the position of the manually movable member in terms of degrees of the cycle of operating means, and voltage comparison means for comparing said fixed value of voltage with the instantaneous value of said sawtooth voltage and causing energization of said lamp each time that the instantaneous value of said sawtooth voltage bears a predetermined relation to said fixed value of voltage so that said lamp is illuminated once each cycle of said sawtooth voltage at a time which differs from the time at which the firing voltage is applied to the plug by the extent of adjustment of said adjustable means so that the amount of the spark advance is indicated by said indicating means associated with the adjustable means without the use of any means for measuring the elapsed time between the application of the firing voltage to said plug and the time of energization of said lamp.

2. The apparatus of claim 1 in which the means for generating a sawtooth voltage comprises a capacitor charging circuit and in which there is means for adjusting the impedance in said capacitor charging circuit to vary the timing rate of said circuit and maintain the maximum amplitude of said sawtooth voltage substantially constant regardless of the speed at which the engine is being operated.

3. The apparatus of claim 2 in which the means for adjusting the timing rate of said capacitor charging circuit comprises means responsive to the maximum amplitude of said sawtooth voltage.

4. The apparatus of claim 2 in which the means for generating a sawtooth voltage comprises a capacitor charging circuit including an electronic impedance in series with a capacitor and in which there is means responsive to the maximum amplitude of said sawtooth voltage for varying the conductivity of said electronic impedance.

5. The apparatus of claim 4 in which the electronic impedance is a transistor.

6. The apparatus of claim 1 in which the energization of the lamp is controlled by an electronic switch and in which the conductivity of said electronic switch is controlled by said voltage comparison means.

7. The apparatus of claim 1 in which the engine is a multicylinder engine having a spark plug for each cylinder with means for sequentially applying a firing voltage to each of said spark plugs and in which each cycle of the sawtooth voltage is initiated at the time that a firing voltage is applied to a selected one of said spark plugs.